US010069970B1

(12) United States Patent
Drake et al.

(10) Patent No.: US 10,069,970 B1
(45) Date of Patent: Sep. 4, 2018

(54) KEYWORD BASED PHONE DIALING

(71) Applicant: T-Mobile USA, Inc., Bellevue, WA (US)

(72) Inventors: Aaron Drake, Sammamish, WA (US); Araceli Lesko, Bainbridge Island, WA (US)

(73) Assignee: T-Mobile USA, Inc., Bellevue, WA (US)

(*) Notice: Subject to any disclaimer, the term of this patent is extended or adjusted under 35 U.S.C. 154(b) by 0 days.

(21) Appl. No.: 15/680,174

(22) Filed: Aug. 17, 2017

(51) Int. Cl.
H04M 3/42 (2006.01)
H04M 3/44 (2006.01)
H04M 3/02 (2006.01)

(52) U.S. Cl.
CPC ............... H04M 3/44 (2013.01); H04M 3/02 (2013.01)

(58) Field of Classification Search
CPC ........................................................ H04M 3/44
USPC ...................................................... 455/414.1
See application file for complete search history.

(56) References Cited

U.S. PATENT DOCUMENTS

2003/0231759 A1* 12/2003 Bedingfield, Sr. .......................... H04M 3/42272
379/355.01

* cited by examiner

Primary Examiner — Joel Ajayi
(74) Attorney, Agent, or Firm — Han Santos, PLLC

(57) ABSTRACT

Keyword based phone dialing may provide additional convenience to users that are subscribers of the wireless carrier network. A user input of a string of one or more values is received by a communication application. The string is checked as an alias number query against alias numbers in an alias number data store in response to a determination that a numerical format of the string fails to match a telephone number numerical format. One or more alias numbers from the alias number data store that match or partially match the alias number query are then presented by the communication application. Each of the alias numbers is associated with a different telephone number of a corresponding product or service provider. In response to the communication application receiving a selection of a corresponding alias number, a telephone call is routed to a product or service provider using a corresponding telephone number.

20 Claims, 8 Drawing Sheets

KEYWORD BASED PHONE DIALING

BACKGROUND

Mobile devices are integral to the daily lives of most users. Mobile devices are used to make voice calls, check email and text messages, update social media pages, stream media, browse websites, and so forth. Mobile devices are generally equipped with built-in telephone contact lists and voice user interface (VUI) capabilities. A built-in telephone contact list may store a list of user names and associated contact information. The contact information may include telephone numbers, email addresses, residential addresses, and/or so forth. A voice user interface (VUI) of a mobile device may enable a user of mobile device to input voice commands that prompt the mobile device to perform functions, such as dialing and answering calls. However, while a built-in telephone contact list may provide a list of user names that have been inputted by a user, the contact list does not contain contact information for product or service providers have not been inputted by the user.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
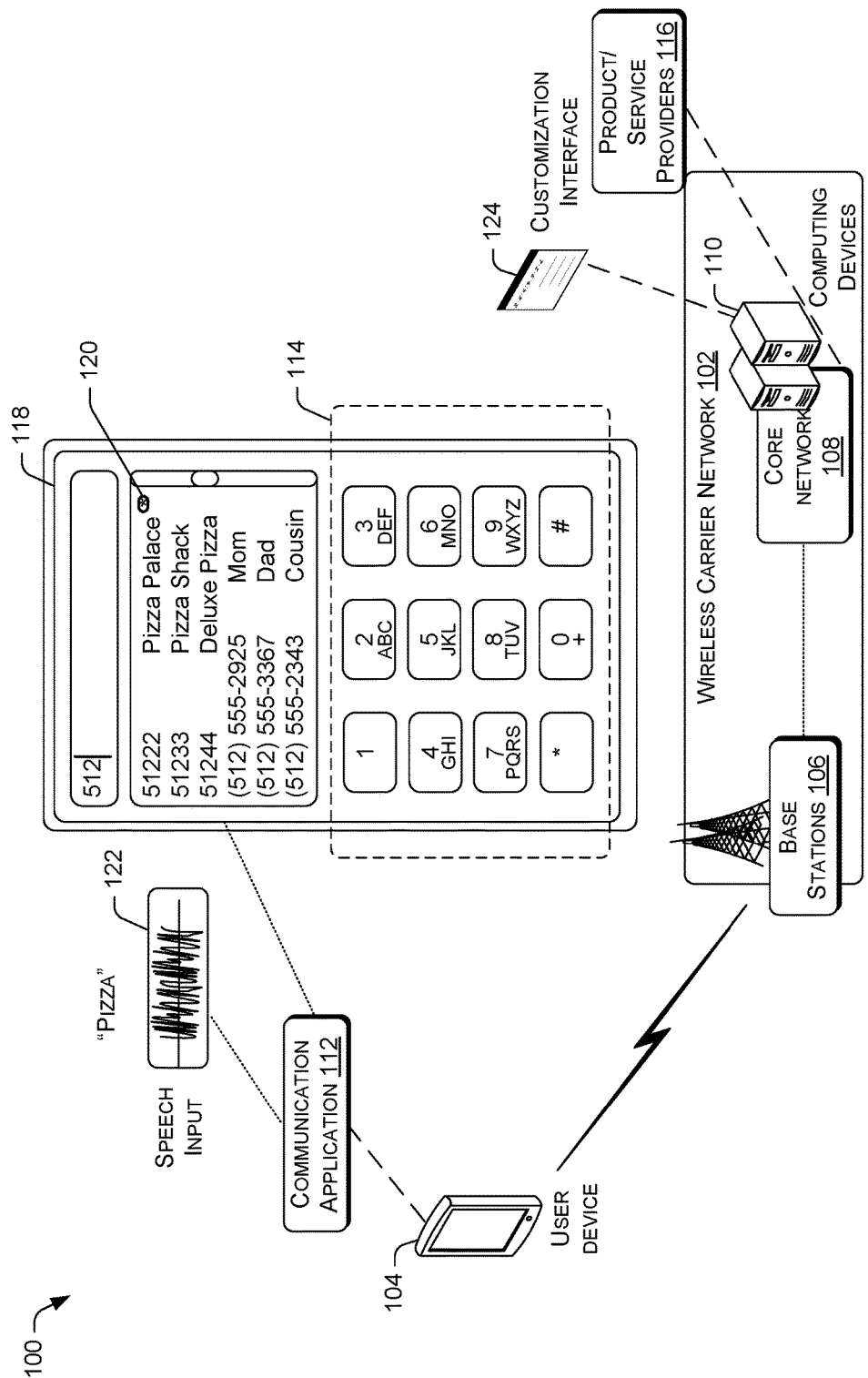
FIG. 1 illustrates an example architecture of a wireless carrier network that provides keyword based phone dialing to enable a user to reach a product or service provider by entering a keyword at a user device.

This disclosure is directed to techniques for keyword based phone dialing to enable a user to reach a product or service provider by entering a keyword at a user device. The keyword may be entered via a voice user interface (VUI) function or a numeric dialing keypad of the user device. In turn, a communication application on the user device may retrieve an alias number that is associated with the keyword from an alias number data store. The alias number data store may be a database that resides on the user device or resides on the wireless carrier network. The alias number may be a code number that corresponds to a particular product or service provider. The code number is a shortcut number that enables a user to initiate a corresponding telephone call to a corresponding product or service provider without dialing an actual telephone number of the corresponding product or service provider. The retrieved alias number may be presented on a display of the user device by the communication application with an accompanying description of the particular product or service provider. Subsequently, a selection of the alias number may cause the communication application to send a call initiation request to a wireless carrier network. In turn, the wireless carrier network may route a corresponding call to the particular product or service provider. Alternatively, a selection of the alias number may cause the communication application initiate a message, navigate to a predetermined web page via a web browser, or initiate a data connectivity session. For example, the message may be a Short Messaging Service (SMS) message, a Rich Communications Services (RCS) message, a Multimedia Message Service (MMS) message, or a Unicode or Multibyte Character Set (MBCS) message.

In alternative embodiments, the user may input a string of one or more values into the communication application. Upon recognizing that the string is an alias number or a portion of an alias number, the communication application may check the string against an alias number data store for one or more matching or partially matching alias numbers. The one or more matching or partially matching alias numbers and their accompanying descriptions may be presented by the communication application on a display of the user device. Accordingly, a selection of an alias number that is presented may cause the communication application to send a call initiation request to the wireless carrier network. In turn, the wireless carrier network may route a corresponding call to the particular product or service provider.

In various embodiments, the wireless carrier network may assign an alias number to a specific product or service provider in return for a payment of a fee. In this way, the wireless carrier network may monetize the presentation of the alias number on multiple user devices. The wireless carrier network may further performance analysis on the mappings between a particular keyword to multiple alias numbers, such as for the purpose of ranking the associations made by multiple users for the alias numbers and the particular keyword.

The implementation of keyword based phone dialing may provide additional convenience to users that are subscribers of the wireless carrier network. For example, the use of keyword based phone dialing may enable a user may to initiate a call to a particular product or service provider without having to resort to a web search to look up the relevant telephone number. In this way, the implementation may reduce network data traffic and the use of computational resources by the wireless carrier network for routing provider contact information search queries to search engines, as well as returning search results to user devices. Furthermore, because the display of alias numbers by a user device can be tailored to the dialing preferences and habits of a user, the user may choose to memorize alias numbers or associated keywords that are most meaningful to them. The techniques described herein may be implemented in a number of ways. Example implementations are provided below with reference to the following figures.

Example Architecture

FIG. 1 illustrates an example architecture of a wireless carrier network that provides keyword based phone dialing to enable a user to reach a product or service provider by entering a keyword at a user device. The wireless carrier network 102 may provide a wide range of mobile communication services, as well as ancillary services and features, to subscribers and associated mobile device users. In various embodiments, the wireless carrier network 102 may provide wireless communication between multiple user devices, such as the user device 104. Further, the wireless carrier network 102 may also provide communications between the multiple user devices and user devices that are serviced by other telecommunications networks. In various embodiments, the user devices may include mobile handsets, smart phones, tablet computers, personal digital assistants (PDAs), smart watches, and/or electronic devices.

The wireless carrier network 102 may be implemented using multiple interconnected networks. In various embodiments, the wireless carrier network 102 may include multiple Radio Access Networks (RANs). The RANs may be connected to each other via regional ground networks. In turn, the regional ground networks may be connected to a core network by a wide area network (WAN). Each regional portion of the wireless carrier network 102 may include one or more RANs and a regional circuit and/or packet switched network and associated signaling network facilities. The wireless carrier network 102 may provide telecommunication and data communication in accordance with one or more technical standards, such as Enhanced Data Rates for GSM Evolution (EDGE), Wideband Code Division Multiple Access (W-CDMA), High Speed Packed Access (HSPA), Long Term Evolution (LTE), CDMA-2000 (Code Division Multiple Access 2000), 5th Generation (5G), and/or so forth. In some embodiments, the core network of the wireless carrier network 102 may accessed via wired or wireless local area networks (LANs). For example, a wireless local area network may be a network that is established using Wi-Fi or Bluetooth standards and hardware.

A RAN of the wireless carrier network 102 may include a number of base stations 106. In some embodiments, the base stations 106 may be in the form of nodes. Each node may include a base transceiver system (BTS) that communicates via an antennae system over an air-link with one or more user devices that are within range. The BTS may send radio communication signals to user devices and receive radio communication signals from user devices. The RANs may carry the communications of the user devices between the respective base stations 106 and the core network 108. The core network 108 may connect to a public packet data communication network, such as the Internet. Data and voice communications via the RANs, the core network 108, and the Internet may support a variety of services through the wireless carrier network 102.

In various embodiments, 2G and/or 3G network components of the wireless carrier network 102 may include a serving GPRS support node (SGSN) that routes voice calls to and from the public switched telephone network (PSTN), a Gateway GPRS Support Node (GGSN) that handles the routing of data communication between external packet switched networks and the core network 108. The network components may further include a Packet Data Network (PDN) gateway (PGW) that routes data traffic between the GGSN and the Internet. The LTE components of the wireless carrier network 102 may include an Evolved Packet Core (EPC) and an IP multimedia Subsystem (IMS) core. The various components of the wireless carrier network 102 may be implemented by one or more computing devices 110, such as networked servers.

The user device 104 may be equipped with a communication application 112 that enables a user of the user device 104 to initiate voice calls or multimedia calls to a callee device via a telephone number. Additionally, the communication application 112 may enable the exchange of other forms of communication with other computing devices. For example, the communications may include messages, data connectivity sessions, and/or so forth. The communication application 112 may be a native application that is built into an operating system of the user device 104. Alternatively, the communication application 112 may be an over-the-top (OTT) application that performs similar functions. In some instances, the communication application 112 may receive a string of one or more values that is inputted by a user via a keypad 114 of the user device 104. Upon recognizing that the string is an alias number or a portion of an alias number, the communication application 112 may check the string against an alias number data store for one or more matching or partially matching alias numbers. The alias number data store may be a database that is stored locally on the user device 104, or stored remotely on the computing devices 110 of the wireless carrier network 102. Thus, if the string matches alias numbers that are stored in the alias number data store, the communication application 112 may present the matching alias numbers and their accompanying descriptions on a display of the user device. Each alias number may be a code number that corresponds to a particular product or service provider. The accompanying descriptions of the alias numbers may contain names of product or service providers (e.g., product or service providers 116) that are reachable via the alias numbers.

For example, as shown on an example display 118 of the user device 104, when the user enters the string "512", the communication application may display "51222 Pizza Palace", "51233 Pizza Shack", and "51244 Deluxe Pizza." Accordingly, a selection of an alias number that is presented may cause the communication application 112 to send a call initiation request to the wireless carrier network 102. For example, the user may select "51222 Pizza Palace" to place a telephone call to "Pizza Palace" via an associated telephone number. Alternatively, the user may complete the entry of the entire alias number "51222" and activate a call initiation function of the communication application 112 to place the telephone call to "Pizza Palace." In turn, the wireless carrier network 102 may route the corresponding call to the particular service provider (e.g., Pizza Palace). In other embodiments, the selection of an alias number that is presented may cause the communication application 112 to initiate a message, such as a SMS message, a RCS message, a MMS message, or a MBCS message. In additional embodiments, the selection of an alias number that is presented may cause the communication application 112 to navigate to a predetermined webpage via a web browser or initiate a data connectivity session. For example, the web page may be a product ordering page of a product provider or a service ordering page of a service provider. In another example, the data connectivity session may enable the user to live chat with a service representative of the product or service provider.

In one scenario, a product or service provider may pay a fee or other incentives to the wireless carrier network 102 to have its telephone number associated with a particular alias number. Alternatively, the alias number may be inserted by the wireless carrier network 102 to promote a product or service of the wireless carrier network 102. Such alias numbers as displayed on the example display 118 may be accompanied by a special icon or symbol 120 that indicates the alias number is sponsored by a third-party or originated by the wireless carrier network 102. An alias number sponsored by a product or service provider may be accompanied by a different icon than an alias number that is inserted by the wireless carrier network 102. For example, Pizza Palace may pay a monthly fee to have its telephone number associated with the alias number "51222". Thus, the alias number "51222" is accompanied by an icon that indicates that the alias number is a sponsored alias number.

In some instances, the communication application 112 may further display telephone numbers stored in a local address of the user device that partially match the string. For example, as shown in the example display 118, in the case of the string "512", the communication application 112 may display a list of telephone numbers that start with the numerals "512." In other instances, the communication application 112 may also display a list of other numbers that contains the string of one or more values. For example, the communication application 112 may display a list of star codes, also known as vertical service code (VSC) that contain the numerals "512".

In other instances, the communication application 112 may have voice user interface (VUI) that enables the user to input numerical values or keywords via a microphone or other transducer of the user device 104. In such instances, the VUI capabilities may be provided by an onboard speech interpretation engine or a remote speech interpretation engine. For example, the VUI may include signal processing components for converting audio into digital data, and vice versa, and network interface components for send and receiving digital data to other devices via a network. Accordingly, speech input is converted by VUI into a digital speech snippet. In turn, the digital speech snippet is transmitted by the VUI to a speech interpretation engine that is onboard the user device or located at a remote network location. The remote speech interpretation engine may be a service that is operated by the wireless carrier network 102 or a third-party service provider. The speech interpretation engine may be a speech-to-text engine that uses a speech conversion algorithm to convert the digital speech snippet into a persistent data representation that is in the form of a textual representation or a sound pattern of phonemes. The persistent data representation is then transmitted by the speech interpretation engine back to the communication application 112 as input. Accordingly, in the example described above, rather than entering the string "512" via a keypad 114 of the user device, the user may speak the string "512" into the VUI of the user device 104.

The VUI of the user device 104 may also enable a user to enter a keyword into the communication application 112 via speech input 122. In turn, the communication application 112 may retrieve an alias number that is associated with the keyword from the alias number data store. The retrieved alias number may be presented on a display of the user device by the communication application with an accompanying description of the particular product or service provider. For example, the keyword spoken by the user into the VUI of the user device 104 may be "Pizza". In turn, the keyword "Pizza" may be mapped to the alias number "51233" in the alias number data store. As a result, the communication application 112 may present the alias number entry "51233 Pizza Shack" on the display 118 of the user device 104. Subsequently, a selection of the alias number may cause the communication application 112 to send a call initiation request to the wireless carrier network 102. In turn, the wireless carrier network 102 may route a corresponding call to the particular product or service provider.

Alternatively, a keyword may be mapped to multiple alias numbers. For example, the keyword "Pizza" may be concurrently mapped to the alias number entries "51222 Pizza Palace", "51233 Pizza Shack", and "51244 Deluxe Pizza." Accordingly, the communication application 112 may present all of these alias numbers on the display 118 when the keyword "Pizza" is inputted by the user. In additional embodiments, the input of a keyword may be performed via the keypad 114 instead of the VUI. For example, instead of speaking the keyword "Pizza" into the VUI of the user device 104, the user may use the keypad to enter the numerical sequence "74992," which may be converted into "Pizza" via internationally standardized letter mapping between letters and number keys for numerical keypads. In such an example, the user may activate a predetermined key, such as the "#" symbol following the numerical sequence, to signal to the communication application 112 that the numerical sequence is a keyword entry. Other example symbols for signaling to the communication application 112 that the numerical sequence is a keyword entry may include "#", "**", or "##".

The customization interface 124 may enable a user to customize an alias number data store that resides on the user device 104 or the computing devices 110 of the core network 108. In various embodiments, the customization interface 124 may be a network portal that is provided by the wireless carrier network 102 for access by a user via the Internet, or a user configuration interface displayed on the user device 104. The customization interface 124 may enable a user to edit the alias number data store to change the mapping between an alias number and a product or service provider. For example, the alias number data store may contain provider entries, in which each alias number entry includes a name of a particular product or service provider, an alias number of the provider, a description of the provider, and a telephone number or another type of call routing number for the provider. The customization interface 124 may enable the user to associate a specific provider data entry to a particular alias number data entry. The customization interface 124 may further enable the user to map a new keyword to one or more alias numbers. In various embodiments, each alias number data entry in the alias number data store may include a field for storing an associated keyword.

In other embodiments, rather than a telephone number or a call routing number, an alias number entry may include a uniform resource locator (URL) or web address of a web page that is to be opened via a web browser, a network address of a data connectivity session, or a message routing number for sending a message to a message recipient. In alternative embodiments, the provider entry for a provider may contain multiple contact numbers or contact addresses that correspond to different geographical areas served by the provider. For example, the provider "Deluxe Pizza" may operate restaurant locations in multiple cities, in which each location has its own contact number of or web address. Accordingly, the communication application 112 may obtain a current geolocation of the user device 104. Subsequently, the alias number as presented on the display 118 may be configured to trigger the routing of a communication to a contact number or web address belonging to a geographical area served by the provider that matches or is closest to the current geolocation.

Example User Device Components

Figure 2:
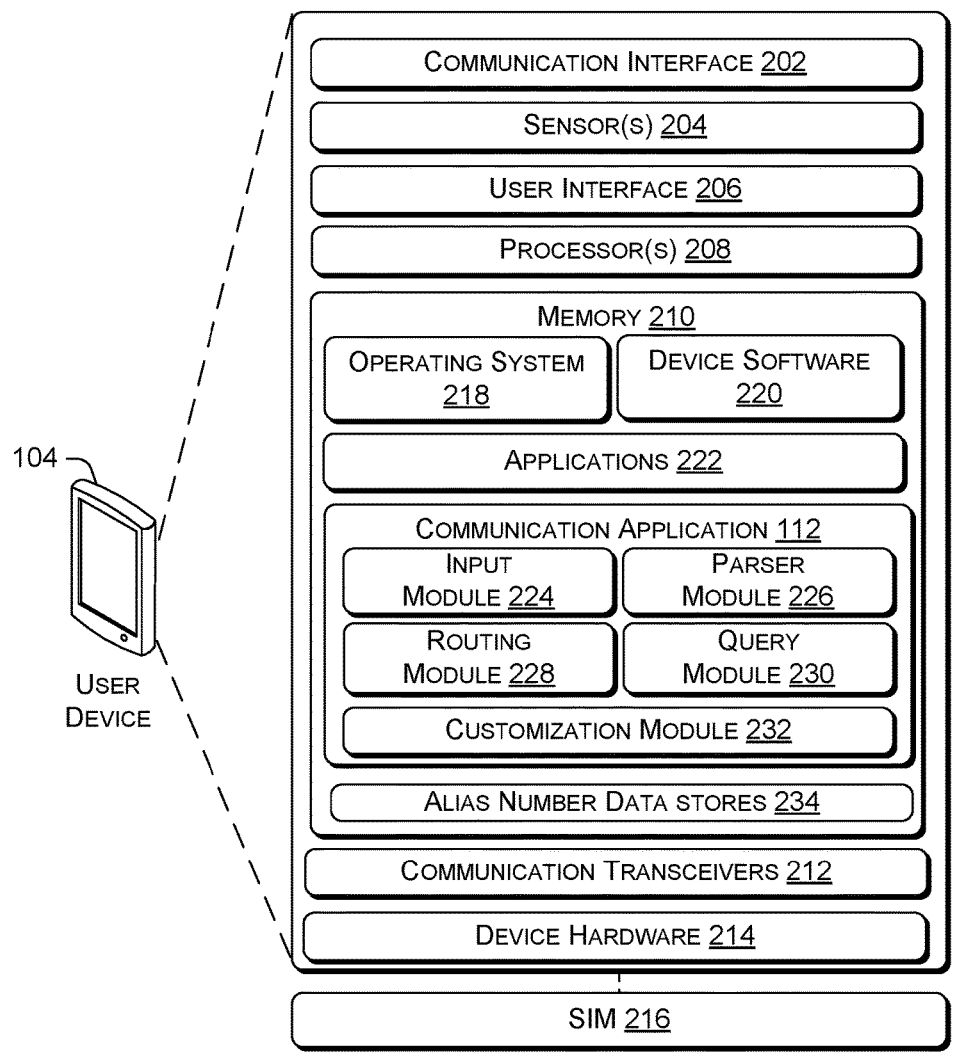
FIG. 2 is a block diagram showing various components of a user device that interfaces with a wireless carrier network to enable a user to reach a product or service provider by entering a keyword at a user device.

FIG. 2 is a block diagram showing various components of the user device 104 that interfaces with a wireless carrier network to enable a user to reach a product or service provider by entering a keyword at a user device. The user device 104 may include a communication interface 202, one or more sensors 204, a user interface 206, one or more processors 208, and memory 210. The communication interface 202 may include wireless and/or wired communication components that enable the electronic device to transmit or receive voice or data communication via the wireless carrier network 102, as well as other telecommunication and/or data communication networks. The sensors 204 may include a proximity sensor, a compass, an accelerometer, altimeter, cameras, and/or a global positioning system (GPS) sensor. The proximity sensor may detect movement of objects that are proximate the user device 104. The compass, the accelerometer, and the GPS sensor may detect orientation, movement, and geolocation of the user device 104.

The user interface 206 may enable a user to provide inputs and receive outputs from the user device 104. The user interface 206 may include a data output device (e.g., visual display, audio speakers), and one or more data input devices. The data input devices may include, but are not limited to, combinations of one or more of keypads, keyboards, mouse devices, touch screens, microphones, speech recognition packages, and any other suitable devices or other electronic/software selection methods.

The memory 210 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital optical disks or other optical storage, magnetic cassettes, magnetic tape, magnetic disk storage or other magnetic storage devices, or any other non-transmission or non-transitory medium that can be used to store information for access by a computing device. In contrast, communication media may embody computer-readable instructions, data structures, program modules, or other data in a modulated data signal, such as a carrier wave, or other transmission mechanism.

The user device 104 may also include communication transceivers 212 and other device hardware 214. The communication transceivers are hardware components that enable the user device 104 to perform telecommunication and data communication with the multiple communications network, such as the wireless carrier network 102 and a remote network. The device hardware 214 may include other hardware that is typically located in a mobile telecommunication device. For example, the device hardware 214 may include signal converters, transceivers, antennas, hardware decoders and encoders, graphic processors, a SIM card slot, and/or the like that enable the user device 104 to execute applications and provide telecommunication and data communication functions. The SIM 216 may be an integrated circuit chip that is inserted into the SIM card slot of the user device 104, or an embedded SIM that is hardwired into the circuit board of the user device 104.

The one or more processors 208 and the memory 210 of the user device 104 may implement an operating system 218, device software 220, and one or more applications 222. The various software and applications may include routines, program instructions, code segments, objects, and/or data structures that perform particular tasks or implement particular abstract data types. The operating system 218 may include components that enable the user device 104 to receive and transmit data via various interfaces (e.g., user controls, communication interface 202, and/or memory input/output devices). The operating system 218 may also process data using the one or more processors 208 to generate outputs based on inputs that are received via the user interface 206. For example, the operating system 218 may provide an execution environment for the execution of the applications 222 and the communication application 112. The operating system 218 may include a presentation component that presents the output (e.g., display the data on an electronic display, store the data in memory, transmit the data to another electronic device, etc.).

The operating system 218 may include an interface layer that enables applications to interface with the communication transceivers 212 and/or the communication interface 202. The interface layer may comprise public APIs, private APIs, or a combination of both public APIs and private APIs. Additionally, the operating system 218 may include other components that perform various other functions generally associated with an operating system. The device software 220 may include software components that enable the user device to perform functions. For example, the device software 220 may include basic input/output system (BIOS), Boot ROM, or a bootloader that boots up the user device 104 and executes the operating system 218 following power up of the device.

The applications 222 may include applications that provide utility, entertainment, and/or productivity functionalities to a user of the user device 104. For example, the applications 222 may include a RCS application, a video calling application, a Wi-Fi calling application, a VoLTE calling application, and/or so forth. The applications 222 may further include electronic mail applications, remote desktop applications, web browser applications, navigation applications, office productivity applications, multimedia streaming applications, and/or so forth.

The communication application 112 may include an input module 224, parser module 226, a routing module 228, a query module 230, and a customization module 232. The input module 224 may process user inputs that are received via the user interface 206. For example, the input module 224 may include VUI components that are to receive data input in the form of persistent data representation, or data input that is entered via the keypad 114 to a dialing interface presented by the input module 224. In some embodiments, the input module 224 may determine that the user has complete a data input of a particular data string when no new value input is received within a predetermined amount of time (e.g., within two seconds) or when the user activates a specific key (e.g., an enter key, a # key, etc.). Accordingly, the input module 224 may store the particular data string in a memory buffer.

The parser module 226 may determine whether the data string as stored in the memory buffer by the input module 224 is a telephone number, an alias number query, or a keyword query. In various embodiments, the parser module 226 may determine that an inputted data string is a telephone number if the data string contains a value having specific numbers of digits. For example, if the data string contains a value with seven digits or 10 digits, the parser module 226 may determine that the value is a telephone number. Otherwise, the parser module 226 may determine that the value is an alias number query. In some embodiments, if the data string contains a numerical value that is followed by one or more specific symbols, such as the "#" sign, the parser module 226 may determine that the numerical value is a keyword query. In such instances, the parser module 226 may use a lettering mapping algorithm to translate the numerical value into all possible keyword permutations. The parser module 226 may also interpret persistent data representations in the form of words or phrases as keywords. In the event that the parser module 226 determines that a data string is a telephone number, the parser module 226 may wait for a user input that activates the routing module 228 to initiate a telephone call using the telephone number. For example, the input may be the activation of a "send" key or a "cancel" key. On the other hand, the parser module 226 may pass alias number queries and keyword queries to the query module 230.

The routing module 228 may initiate a telephone call using a telephone number that is provided by the parser module 226. In various embodiments, the telephone call may be initiated by the routing module 228 to the wireless carrier network 102 as an EDGE/3G voice call, a Voice over LTE (VoLTE) call, or a Video over LTE (ViLTE) call. For example, the routing module 228 may interface with the IMS core of the wireless carrier network 102 to establish Internet Protocol (IP) data packet-based voice/video communication call services. Alternatively, the routing module 228 may initiate a Voice over wireless LAN (VoWLAN) call or a Video over wireless LAN (ViWLAN) call based on the telephone number. The VoWLAN call or the ViWLAN call may be initiated using an available wireless broadband network implemented according to IEEE 802.11 standards to carry voice and/or video communication.

The query module 230 may search an alias number data store 234 for one or more alias number entries that match an alias number query received from the parser module 226. The alias number data store 234 may be located in the memory 210 of the user device 104. The alias number data store 234 may be one of several similar alias number data stores in the memory 210, in which each data store is associated with and selectable for use via a device identifier, a subscriber access identifier, and/or a user identifier. The device identifier may be a Mobile Station International Subscriber Directory Number (MSISDN), an International Mobile Equipment Identity (IMEI), an International Mobile Subscriber Identity (IMSI), a Mobile Equipment Identifier (MEID) in the form of an Electronic Serial Number (ESN). The subscriber access identifier may be an identifier used by the wireless carrier network 102 is to authenticate the user via a built-in authentication mechanism for the purpose of providing the user with access to services and/or applications that are hosted by the wireless carrier network 102, as well as hosted by third-party service and/or application providers. The user identifier may include a unique identifier that is created by or assigned to the user to identify the user. The user selection of a particular alias number data store for use is stored by the query module 230.

The alias number data store may include one or more databases, such as relational databases, object databases, object-relational databases, and/or key-value databases. In some embodiments, the alias number data store 234 may employ a trie data structure to store the alias number entries. Accordingly, upon finding one or more matching or partially matching alias number entries, the query module 230 may present information from such alias number entries in a matching number display. In such embodiments, the query module 230 may determine a partially match of an alias number of an alias number entry in the database to an alias number query received from parser module 226 when both have an identical series of prefix number values. For example, the alias number query may be "512", and the matching alias number entries may contain the alias numbers "51222", "51233," and "51244". The matching number display that is used to present the information from the matching alias number entries may be a part of a dialing interface that is presented by the input module 224. For example, as shown on an example display 118 of FIG. 1, when the user enters the string "512", a matching number display may present "51222 Pizza Palace", "51233 Pizza Shack", and "51244 Deluxe Pizza." In certain embodiments, an alias number as configured to be displayed by the query module 230 may be accompanied by a special icon or symbol that indicates that the displayed alias number is sponsored by a third-party or originated by the wireless carrier network 102.

In some instances, the query module 230 may also present other relevant information in conjunction with information of the matching alia number entries. For example, the query module 230 may retrieve telephone numbers from a built-in telephone contact list that contain digits matching the prefix alias number values of the alias number query, star codes stored in a store code data store of the user device 104 that contain digits matching the prefix alias number values of the alias number query, and/or so forth. However, if the query module 230 is unable to match the alias number query to an alias number stored in the alias number data store 234, the query module 230 may cause the matching number display to indicate that no matching alias number is found.

Subsequently, the query module 230 may wait for a user selection of an alias number that is presented on the matching number display. For example, a user may use a keypad or a touch screen to select an alias number. Upon a user selection of an alias number, the query module 230 may retrieve a telephone number from the corresponding alias number entry, and then activate the routing module 228 to initiate a call using the retrieved telephone number. Alternatively, the query module 230 may activate the routing module 228 to initiate a call using the alias number itself. In such alternative embodiments, the routing module 228 may send the alias number to the core network 108 of the wireless carrier network 102. In turn, a translation function of the core network 108 may retrieve a corresponding telephone number that matches the alias number, and then initiate a telephone call between the user device 104 and a communication device associated with the telephone number. In some instances, a user may directly enter an alias number query by inputting a complete alias number following by one or more specific symbols, such as the "*" symbol (different from the symbols used to designate keyword inputs). In such instances, the query module 230 may search for only an alias number that matches the specific alias number query. If a matching alias number is found, the query module 230 may initiate a call using a corresponding telephone number of the alias number. Otherwise, the query module 230 may cause the matching number display to indicate that no matching alias number is found.

In alternative embodiments, the query module 230 may search an alias number data store 234 for one or more alias number entries that match or partially match a keyword query received from the parser module 226. In instances in which the parser module 226 derives multiple keyword query permutations from a single numerical value entry, the query module 230 may perform such a search for every keyword query permutation. For example, an alias number entry stored in the alias number data store 234 may include information that indicates its corresponding alias number is associated with a particular keyword. Thus, a keyword query may match or partially match the particular keyword. For example, a keyword query may match a particular keyword associated with an alias number when the string of characters in both are identical. In contrast, a keyword query may partially match a particular keyword associated with an alias number when the keyword query and the keyword share an identical string of beginning characters, middle characters, or ending characters.

Accordingly, upon finding one or more matching or partially matching alias number entries through a keyword query, the query module 230 may present information from such alias number entries in a matching number display. For example, the keyword query may be "Pizza", and the matching alias number entries may be "51222 Pizza Palace", "51233 Pizza Shack", and "51244 Deluxe Pizza." Once again, the query module 230 may wait for a user selection of an alias number that is presented on the matching number display. Furthermore, the query module 230 may also present other relevant information in conjunction with information of the matching alia number entries. For example, the query module 230 may retrieve telephone numbers from a built-in telephone contact list that contain digits matching the inputted numerical values that correspond to the keyword query, star codes stored in a code data store of the user device 104 that contain digits matching the inputted numerical values of the keyword query, and/or so forth. However, if the query module 230 is unable to match the keyword query to an alias number stored in the alias number data store 234, the query module 230 may cause the matching number display to indicate that no matching alias number is found.

In some embodiments, an alias number entry in an alias number data store may indicate that an alias number is associated with a message routing number. In such embodiments, the routing module 228 may, upon a selection of the alias number, prompt a user to input and/or append message content for a corresponding message. Once the message content has been inputted or appended by the user, the routing module 228 may initiate the routing of the message to the wireless carrier network 102 for delivery to a message recipient. In other embodiments, an alias number entry in an alias number data store may indicate that the alias number is associated with a predetermined URL or a web address of a web page, or a network address of a data connectivity session. In such embodiments, upon a selection of the alias number, the routing module 228 may activate a web browser to open the web page via the predetermined URL or web address, or initiate the data connectivity session via the network address.

In alternative embodiments, the provider entry for a provider in an alias number data store may contain multiple contact numbers or contact addresses that correspond to different geographical areas served by the provider. Accordingly, the query module 230 may obtain a current geolocation of the user device 104 from the sensors 204. As such, the query module 230 may configure an alias number as presented on the display 118 to trigger the routing of a communication to a contact number or address that belongs to a geographical area served by the provider that matches or is closest to the current geolocation.

The customization module 232 may enable a user of the user device 104 to input customized alias numbers and keywords that are associated with specific telephone numbers. In turn, the customized alias number entries are stored by the customization module 232 in the alias number data store 234. The customization functions provided by the customization module 232 may be accessed in multiple ways. In one way, a user may use a standalone customization interface provided by the customization module 232 on a display of the user device 104 to access the functions. In another way, the user may input an alias number or keyword at a dialing interface provide by the input module 224, and then activate a predetermined option presented by the dialing interface to access the customization functions. In a variation of this way, the user may input an alias number or keyword in conjunction via the VUI, and then speak a predetermined verbal command to activate the customization functions provided by the customization module 232. In an additional way, the matching number display presented by the query module 230 may display an option to create a new alias number entry in the alias number data store 324. The matching number display may display such an option in instances where no matching alias number is found for an inputted alias number query or keyword query.

The customization functions provided by the customization module 232 may include viewing, creating, deleting, and updating alias number entries. For example, a user may input an alias number "51222," then use the customization module 232 to create an alias number entry for the alias number which associates the alias number with the service provider name "Pizza Palace," and a telephone number for reaching the service provider. Subsequently, the user may either delete such an alias number entry, or modify the information in the alias number entry. For example, the alias number entry may be modified so that the alias number "51222" is associated with the name and telephone number for "Deluxe Pizza" rather than "Pizza Palace." The customization functions may further include viewing, creating, deleting, and updating the association between alias numbers and keywords. For example, a user may select an alias number (e.g., "51222" for Pizza Palace), and then activate a keyword creation option in order to input the keyword "Pizza" as being associated with the alias number. In another example, the user may view such a keyword association, and then either delete such an association or modify the association (e.g., associate the keyword "lunch" with the alias number "51222" of "Pizza Palace". While the embodiments in FIG. 2 are described in the context of using an alias number data store in the memory 210 of the user device 104, it will be appreciated that the functionalities of searching for and providing alias numbers that match alias number queries and keyword queries may be offloaded to the core network 108 of the wireless carrier network 102. Such alternative embodiments are further described below with respect to FIG. 3.

Example Wireless Carrier Network Computing Device Components

Figure 3:
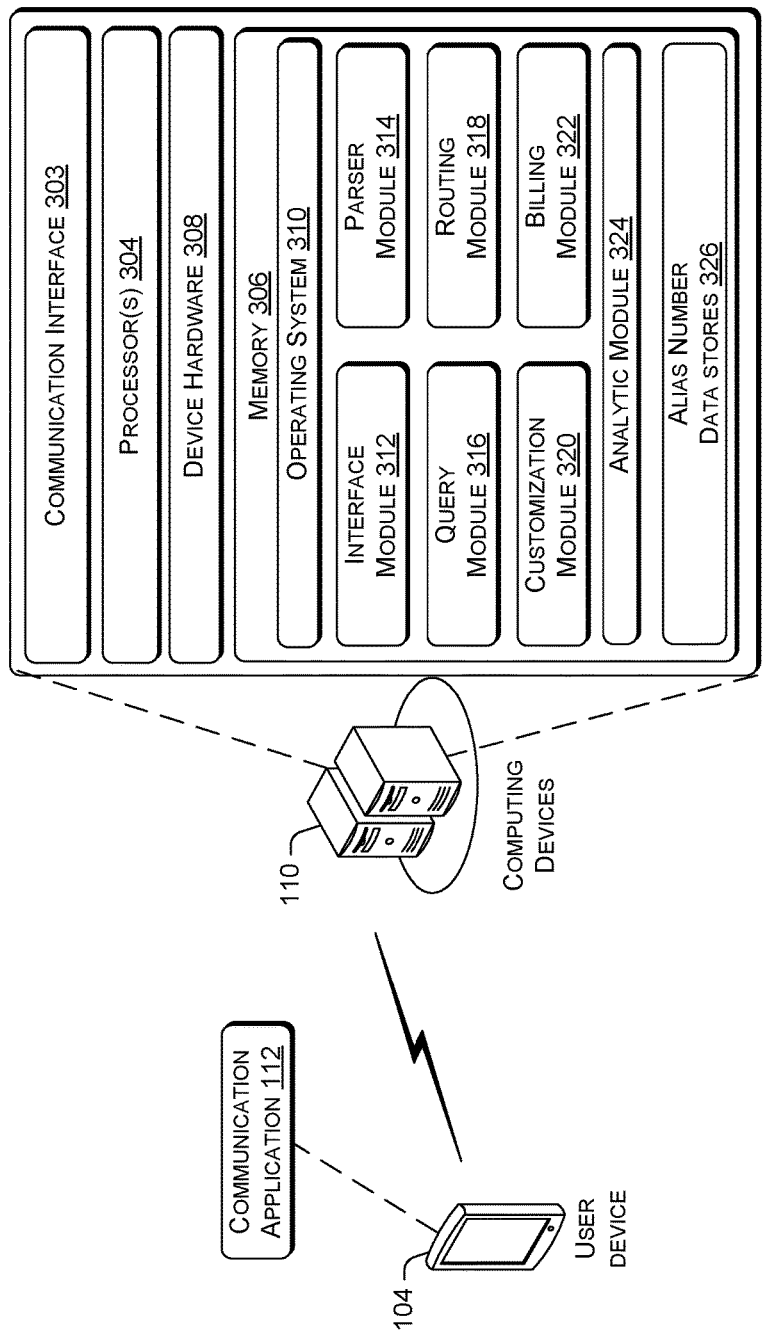
FIG. 3 is a block diagram showing various components of one or more computing devices with a wireless carrier network to enable a user to reach a product or service provider by entering a keyword at a user device.

FIG. 3 is a block diagram showing various components of one or more computing devices of a wireless carrier network that enable a user to contact a product or service provider by entering a keyword at a user device. The computing devices 110 may include general purpose computers, such as desktop computers, tablet computers, laptop computers, servers (such as the computing devices 110), or other electronic devices that are capable of receive inputs, process the inputs, and generate output data. In other embodiments, the computing devices 110 or components thereof may be virtual computing devices in the form of virtual machines or software containers that are hosted in a computing cloud.

The computing devices 110 may include a communication interface 302, one or more processors 304, memory 306, and device hardware 308. The communication interface 302 may include wireless and/or wired communication components that enable the computing devices 110 to transmit data to and receive data from other networked devices. The device hardware 308 may include additional hardware interface, data communication, or data storage hardware. For example, the hardware interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 306 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission or non-transitory medium that can be used to store information for access by a computing device. In contrast, communication media may embody computer-readable instructions, data structures, program modules, or other data in a modulated data signal, such as a carrier wave, or other transmission mechanism.

The processors 304 and the memory 306 of the computing devices 110 may implement an operating system 310. The operating system 310 may include components that enable the computing devices 110 to receive and transmit data via various interfaces (e.g., user controls, communication interface, and/or memory input/output devices), as well as process data using the processors 304 to generate output. The operating system 310 may include a presentation component that presents the output (e.g., display the data on an electronic display, store the data in memory, transmit the data to another electronic device, etc.). For example, the output controller 134 may be a part of the operating system 310. Additionally, the operating system 310 may include other components that perform various additional functions generally associated with an operating system.

The computing devices 110 may implement an interface module 312, a parser module 314, a query module 316, a routing module 318, a customization module 320, a billing module 322, and an analytic module 324. Each of these modules may include routines, program instructions, code segments, objects, and/or data structures that perform particular tasks or implement particular abstract data types. In some embodiments, these modules may be implemented as a part of the home location register (HLR) or the home subscriber server (HSS).

These modules may support embodiments in which the searching for and providing alias numbers that match alias number queries and keyword queries is performed at the core network 108 rather than on individual user devices. In some instances, the interface module 312 may receive user input from a communication application, such as from the input module 224 of the communication application 112. Each user input may be identified via a device identifier, a subscriber access identifier, and/or a user identifier, which ensures that the interface module 312 is able to route any response for the user input to the corresponding user device for presentation by a communication application. In turn, the interface module 312 may forward the user input to the parser module 314, in which the parser module 314 may perform similar functions as the parser module 226 of the communication application 112, except the parser module 314 further interacts with the query module 316.

In other instances, the interface module 312 may receive alias number queries and keyword queries from a communication application on a user device. Each alias number query or keyword query may be identified via a device identifier, a subscriber access identifier, and/or a user identifier, which ensures that the interface module 312 is able to route any query response to the corresponding user device for presentation by a communication application. For example, the interface module 312 may receive such queries from the parser module 226 of the communication application 112 on the user device 104. The interface module 312 may pass such queries to the query module 316, in which the query module 316 may perform similar functions as the query module 230 of the communication application 112. However, the query module 316 may perform its functionalities with respect to one or more alias number data stores 326 that are stored on the computing devices 110, rather than individual alias number data stores on different user devices. In some embodiments, the alias number data stores 326 contains global alias number information, i.e., the alias number information is not customizable by users of individual user devices. This means that the query module 316 will provide all communication applications on different user devices with the same alias number to all user devices in response to a particular alias number query or keyword query as inputted as any user device. For example, regardless of on which user device the alias number query string "512" is inputted, the query module 316 will return the alias number "51222 Pizza Palace." In another example, regardless of on which user device the keyword query "Pizza" is inputted, the query module 316 will return the alias number "51224 Deluxe Pizza."

However, in other embodiments, the alias number data stores 326 may include alias number data stores that are customized for different users. Accordingly, upon receiving an alias number query or a keyword query from a particular user device, the query module 316 may use the identification information (e.g., a device identifier, a subscriber access identifier, a user identifier, etc.) associated with the query to access a corresponding alias number data store. In this way, a user is able to receive customized alias numbers in response to alias number and keyword queries. In such embodiments, a user may select the use of a particular alias number data store of the alias number data stores 326 based on a device identifier, a subscriber access identifier, or a user identifier. Such selection may be performed via a network portal that is provided by the wireless carrier network 102 for access by the user via the Internet, or a user configuration interface displayed on a user device. The user selection of a particular alias number data store for use is stored by the query module 316.

In some embodiments, the query module 316 may include a supplemental query function that is triggered by the user device 104. In some instances, the user device 104 may be a feature phone that is equipped with nothing more than basic dialing functions. Accordingly, the user device 104 may be unable to receive one or more alias numbers that match a keyword query from the query module 316 for display the user device 104. Furthermore, such a user device 104 may be unable to support the initiation of telephone calls, messaging sessions, web sessions, data connectivity sessions through alias numbers. For example, the query module 316 may determine using a device information database of the wireless carrier network 102 that the user device 104 is a feature phone. In such embodiments, upon receiving a dialed or spoken alias number from the user device 104, the supplemental query function may intercept the alias number and provide an interactive function that asks the user to choose from a menu of actions. In one instance, the automated user interface may be an Interactive Voice Response (IVR) function that uses audio prompts to direct the user to press specific numerical keys or speak particular commands to initiate calls to particular product or service providers. In another instance, the interactive function may send a text message that prompts the user to send different text message replies to initiate telephone calls to different product or service providers. The list of product or service providers may include a provider that is closest to a current geolocation of the user device, that is most popular in a geographical area that encompasses or is near the current geolocation of the user device, that has paid fees to be associated with the alias number, and/or so forth. For example, if a user dials the numerical sequence "74992" on a feature phone, the query module 316 may interpret the numerical sequence as an input of the keyword "Pizza". In turn, the query module 316 may provide a list of matching pizza restaurants via the interactive function, and then receive and process a user selection of a particular pizza restaurant to initiate a telephone call to the particular pizza restaurant.

The routing module 318 may route telephone calls, messages, and/or data connectivity session requests that are initiated by the communication application 112 to the corresponding call or message recipients or network destination. For example, the routing module 318 may include the SGSN, the GGSN, the EPC and/or the IMS core. The customization module 320 may enable users of user devices to input customized alias numbers and keywords that are associated with specific telephone numbers for storage in the alias number data stores 326. The customization module 320 may provide similar customization functions as the customization module 232 described in FIG. 2 for multiple users. Users may access the customization module 320 via the customization interface 124, in which the customization interface 124 may be a network portal that is provided by the wireless carrier network 102 for access by a user via the Internet, or a user configuration interface displayed on the user device 104.

The billing module 322 may include a provider billing function that is configured to track and charge a third-party product or service provider for presenting an alias number of the provider on user devices by the query module 316. In various embodiments, the provider billing function may charge a third-party content provider a set fee for each presentation of an alias number on a user device. Other billing arrangements may include billing a set fee for each multiple (e.g., five, ten, etc.) presentations of an alias number. Volume-based escalated billing or discounted billing may also be performed, such that the fee per each presentation of an alias number may increase or decrease based on the volume of each alias number that is presented in a predetermined time period. Other billing arrangement for a provider may include a recurring flat fee (e.g., weekly fee, monthly fee, etc.), a one-time fee, and/or so forth. Alternatively or concurrently, the billing module 322 may charge a provider a fixed fee or a periodically recurring fee for associate a keyword with the alias number of the provider.

The analytic module 324 may analyze keyword mapping data for associations that users have configured between particular keywords and specific alias numbers to generate statistics and rankings. The analytic module 324 is configured to perform such analysis on user data of specific users after such users have affirmatively consented to data collection and analysis via a consent option interface presented to the users (e.g., select a consent checkbox, activate a consent button, etc.). Such a consent option interface may be presented via the communication applications on user devices or via web portals. The users may also revoke their consent at any time via the consent option interface. In some embodiments, the analysis performed by the analytic module 324 may generate rankings of associations between a particular keyword and multiple providers of products or services for presentation. For example, the analysis may show that the 16% of users served by the wireless carrier network 102 have configured the keyword "Pizza" to correspond to the alias number "51222 Pizza Palace", 13% of the users have configured the keyword "Pizza" to correspond to the alias number "51233 Pizza Shack", and 11% of the users have configured to keyword "Pizza" to correspond to the alias number "51244 Deluxe Pizza." In other embodiments, the analytic module 324 may analyze the keywords that are created by the users to determine a list of most popular user-created keywords. Additional details regarding the functionalities of the user device and wireless carrier network components are discussed in the context of FIGS. 4-8.

Example Processes

FIGS. 4-8 present illustrative processes 400-800 for providing keyword based phone dialing to enable a user to reach a product or service provider by entering a keyword at a user device. Each of the processes 400-800 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 400-800 are described with reference to the architecture 100 of FIG. 1.

Figure 4:
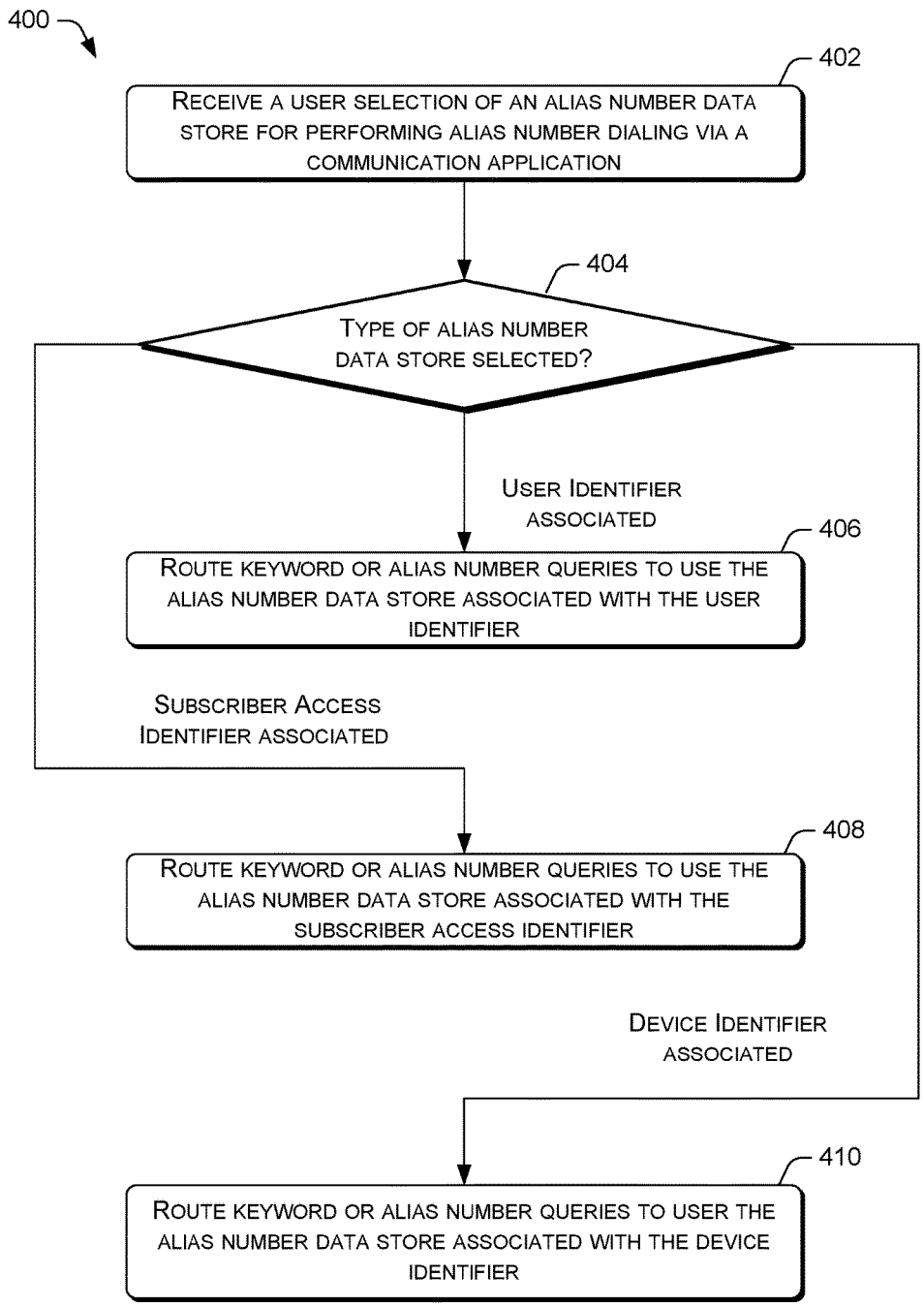
FIG. 4 is a flow diagram of an example process for selecting an alias number data store that enables a user to reach a product or service provider by entering a keyword at a user device.

FIG. 4 is a flow diagram of an example process 400 for selecting an alias number data store that enables a user to reach a product or service provider by entering a keyword at a user device. At block 402, a communication application (e.g., communication application 112) on a user device may receive a user selection of an alias number data store for perform alias numbering dialing via the communication application. In various embodiments, the alias number data store may be a data store on the user device, or a data store that resides on one or more computing devices of the wireless carrier network. At decision block 404, the communication application may determine the type of alias data store selected. Accordingly, if the communication application determines that the selected alias number data store is a data store associated with a user identifier, the process 400 may proceed to block 406. At block 406, the communication application may route keyword and alias queries that are received by the communication application to the alias number data store associated with the user identifier.

However, if the communication application determines at decision block 404 that the selected alias number data store is a data store associated with a subscriber access identifier, the process 400 may proceed to block 408. At block 408, the communication application may route keyword and alias queries that are received by the communication application to the alias number data store associated with the subscriber access identifier.

Further, if the communication application determines at decision block 404 that the selected alias number data store is a data store associated with a device identifier, the process 400 may proceed to block 410. At block 410, the communication application may route keyword and alias queries that are received by the communication application to the alias number data store associated with the device identifier. In alternative embodiments, the functions described in the various blocks may be performed by software components stored on computing devices of the wireless carrier network 102 instead of a communication application on a user device.

Figure 5:
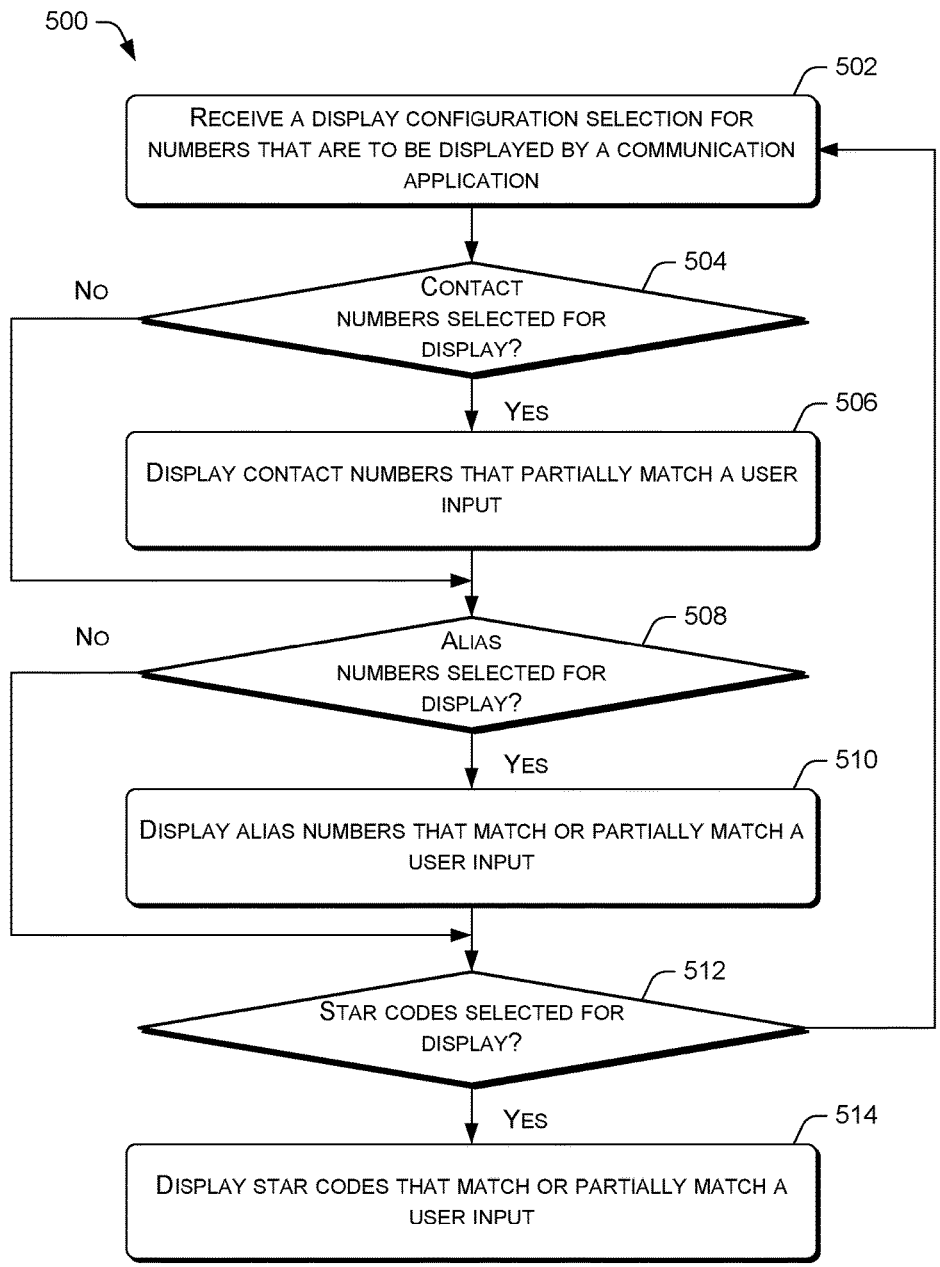
FIG. 5 is a flow diagram of an example process for configuring the display of dialing numbers by a dialing application that enables a user to reach a product or service provide by entering a keyword at a user device.

FIG. 5 is a flow diagram of an example process 500 for configuring the display of dialing numbers by a dialing application that enables a user to reach a product or service provider by entering a keyword at a user device. At block 502, a communication application on a user device may receive a display configuration selection for numbers that are to be displayed by the communication application. For example, the communication application may be the communication application 112 on the user device 104. At decision block 504, the communication application may determine whether the display configuration selection enables the display of matching or partially matching contact numbers in response to a user input. In various embodiments, the user input may include a string of numerical values, and a matching or partially matching contact number may include one or more of these numerical values. The contact numbers may include names and telephone numbers of user contacts that are stored in an address book of the user device. Accordingly, if the contact numbers are selected for display ("yes" at decision block 504), the process 500 may proceed to block 506. At block 506, the communication application may present contact numbers that partially match a user input for display in response to user input. However, if the contact numbers are not selected for display ("no" at decision block 504), the process 500 may proceed to decision block 508).

At decision block 508, the communication application may determine whether the display configuration selection enables the display of matching or partially matching alias numbers in response to an alias number query or a keyword query. Accordingly, if the alias numbers are selected for display ("yes" at decision block 508), the process 500 may proceed to block 510. At block 510, the communication application may present alias numbers that match or partially match a query for display in response to a query. However, if the alias numbers are not selected for display ("no" at decision block 508), the process 500 may proceed to decision block 512.

At decision block 512, the communication application may determine whether the display configuration selection enables the display of matching or partially matching star codes in response to a user input. Accordingly, if the star codes are selected for display ("yes" at decision block 512), the process 500 may proceed to block 514. At block 514, the communication application may present star codes that match or partially match a user input for display in response to a user input. However, if the star codes are not selected for display ("no" at decision block 512), the process 500 may loop back to block 502.

Figure 6:
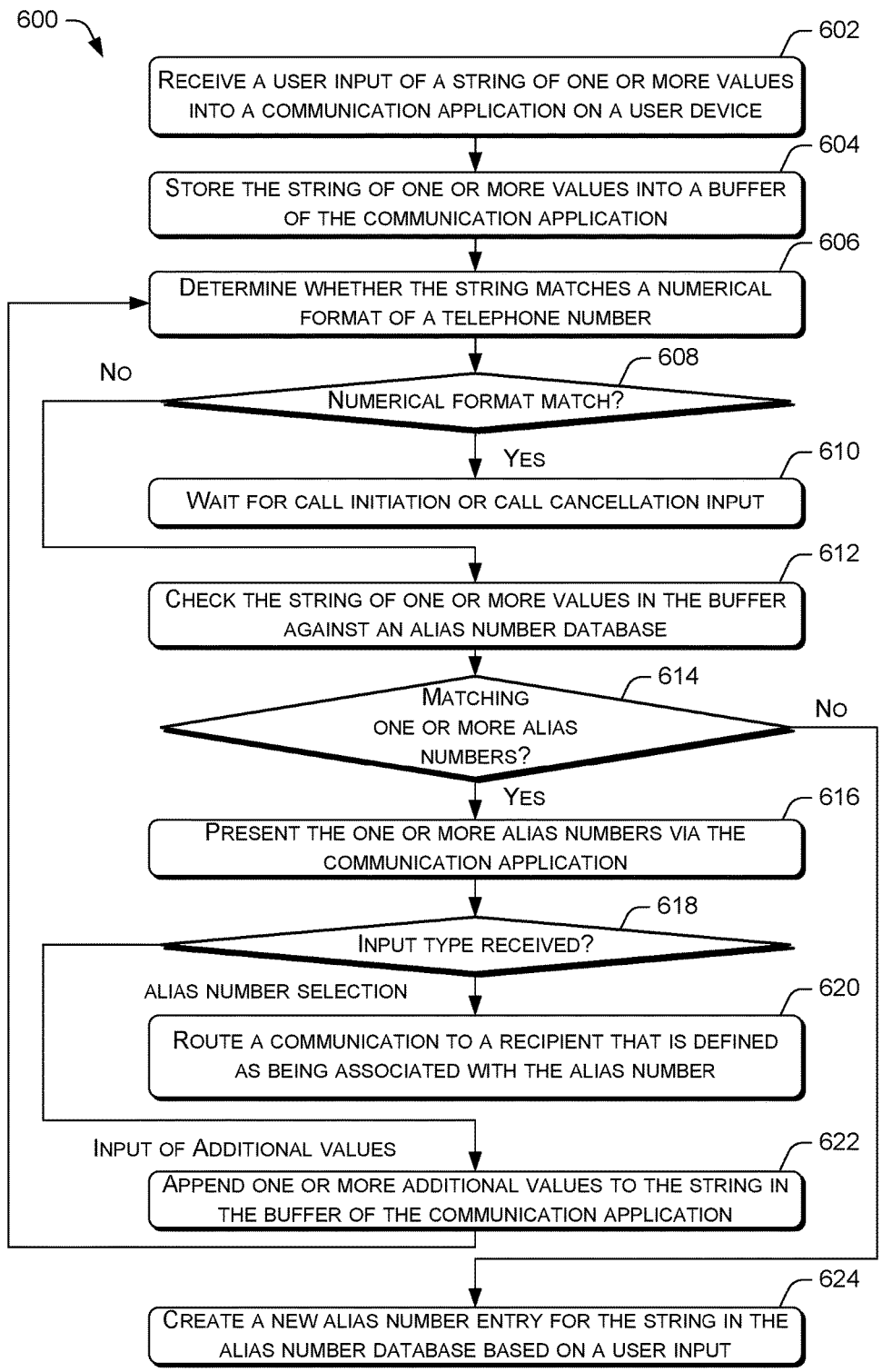
FIG. 6 is a flow diagram of an example process for routing a service request to a product or service provider that is defined as being associated with an alias number.

FIG. 6 is a flow diagram of an example process 600 for routing a service request to a product or service provider that is defined as being associated with an alias number. At block 602, a communication application on a user device may receive a user input of a string one or more values. For example, the communication application may be the communication application 112 on the user device 104. The string one or more values may be inputted via a keypad or a VUI of the user device.

At block 604, the communication application may store the string of one or more values into a memory buffer of the user device. At block 606, the communication application may determine whether a numerical format of the string matches a numerical format of a telephone number. For example, if the data string contains a value with seven digits or 10 digits, the communication application may determine that the value is a telephone number. At decision block 608, if the communication application determines that the string matches a numerical format of a telephone number ("yes" at decision block 608), the process may process to block 610. At block 610, the communication application may wait for a user input that initiates a call using the telephone number or a user input that cancels the call.

However, if the communication application determines that the numerical format of the string fails to, i.e., does not match, the numerical format of a telephone number ("no" at decision block 608), the process 600 may proceed to block 612. At block 612, the communication application may check the string of one or more values in the buffer against an alias number data store. In various embodiments, the alias number data store may contain alias number entries, in which each alias number entry includes a name of a particular product or service provider, an alias number of the provider, a description of the provider, and a telephone number or another type of call routing number for the provider. In other embodiments, rather than a telephone number or a call routing number, an alias number entry may include a uniform resource locator (URL) or web address of a web page that is to be opened via a web browser, a network address of a data connectivity session, or a message routing number for sending a message to a message recipient.

At decision block 614, if the communication application determines that the string matches or partially matches one or more alias numbers, the process 600 may proceed to block 616. In various embodiments, the communication application may determine that an alias number of an alias number entry in the alias number data store partially matches the string when both have an identical series of prefix alias number values. Thus, if the communication application determines that one or more alias numbers are found ("yes" at decision block 614), the process 600 may proceed to block 616. At block 616, the communication application may present the one or more alias numbers in a matching number display of a dialing interface providing the communication application.

At decision block 618, the communication application may determine the input type of an input that is received after the presentation of the one or more alias numbers. If the input is an alias number selection, the process 600 may proceed to block 620. At block 620, the communication application may route a communication to a recipient that defined as being associated with the alias number. For example, the communication application may initiate a telephone call to a call recipient. In another example, the communication application may initiate the sending of a message to a message routing number of a message recipient. The message may include message content inputted by a user. In still another example, the communication application may initiate a data connectivity session via a network address of a recipient network device. However, if the input is one or more additional values, the communication application may append the one or more additional values to the string in the memory buffer of the communication application. Subsequently, the process 600 may loop back to block 606.

Returning to decision block 614, if the communication application determines that the string does not match or does not partially match one or more alias numbers in the alias number data store, the process 600 may proceed to block 624. At block 624, the communication application may create a new alias number entry for the string in the alias number data store based on a user input, i.e., a command to create an alias number entry. Following the input of the command to create an alias number entry, the communication application may provide an interface for the user to input a provider name, a provider telephone number, a description of the provider, and/or so forth into the alias number entry.

Figure 7:
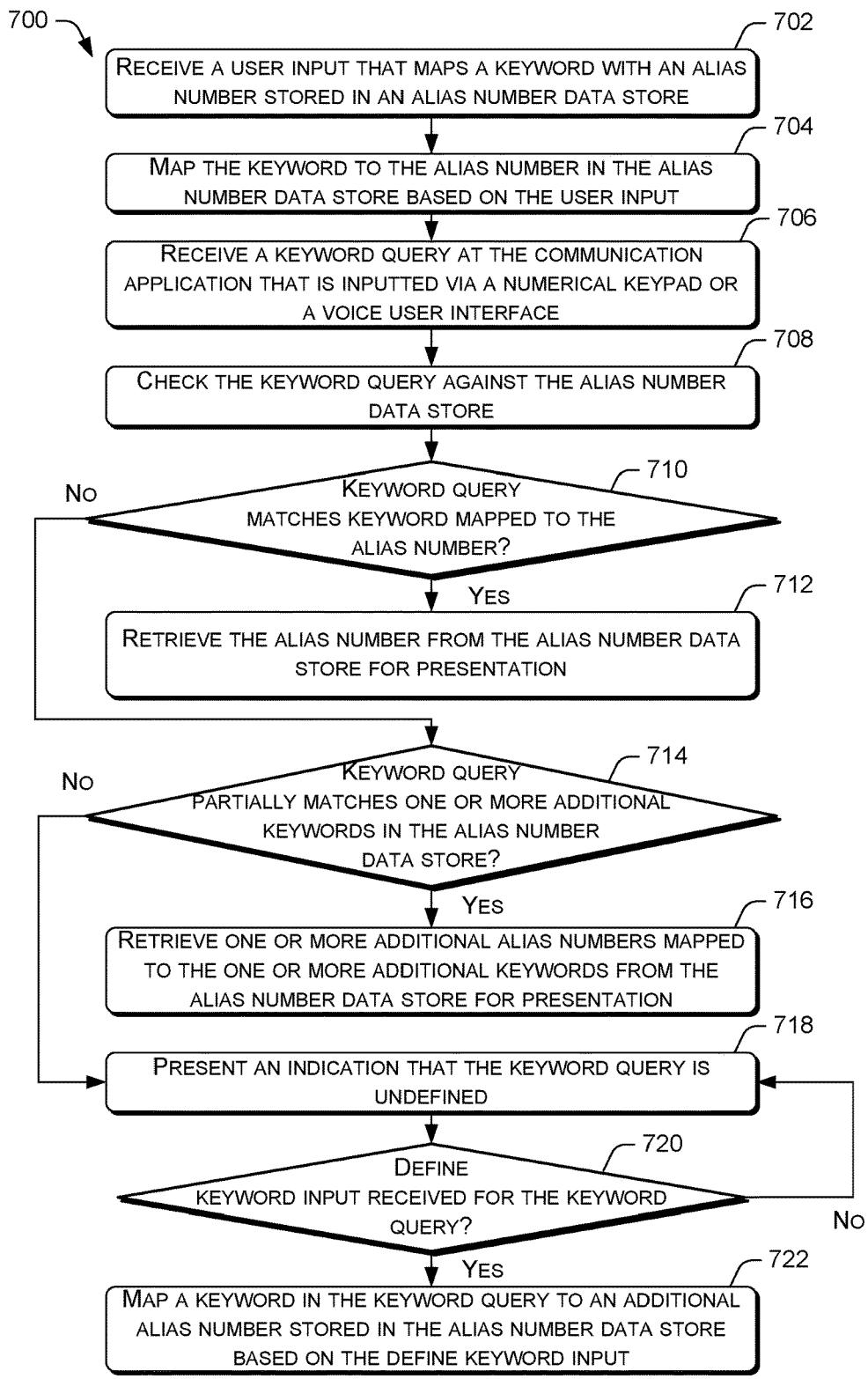
FIG. 7 is a flow diagram of an example process for retrieving a defined alias number from an alias number data store based on a keyword input.

FIG. 7 is a flow diagram of an example process 700 for retrieving a defined alias number from an alias number data store based on a keyword input. At block 702, a communication application on a user device, such as the communication application 112 on the user device 104, may receive a user input that maps a keyword with an alias number stored in an alias number data store. In some embodiments, the alias number data store may be a local data store on a user device. In other embodiments, the alias number data store may be a data store on the computing devices 110 of the wireless carrier network 102. In such embodiments, the input may be received by the core network 108 of the wireless carrier network 102.

At block 704, the communication application may map the keyword to the alias number in the alias number data store on the user device based on the user input. In alternative embodiments, the core network 108 may map the keyword to the alias number in the alias number data store on the computing devices 110 of the wireless carrier network 102. At block 706, the communication application on the user keyword query at the communication application that is inputted via a numerical keypad or a VUI.

At block 708, the communication application may determine whether the keyword query matches the keyword maps to the alias number. Alternatively, the determination may be made by the core network 108 of the wireless carrier network 102 following the communication application sending the keyword query to the core network 108. At decision block 710, if the keyword query matches the keyword that is mapped to the alias number ("yes" at decision block 710), the process 700 may proceed to block 712. At block 712, the communication application may retrieve the alias number from the alias number data store for presentation on a display of the user device. In some embodiments, the alias number may be presented by the communication application on a matching number display of a dialer interface. In embodiments in which the determination is made by the core network 108, the core network 108 may retrieve the alias number from a network alias number data store and send the alias number to the user device. In turn, the communication application on the user device may receive the alias number for display via the dialer interface.

Returning to decision block 710, if the keyword query does not match the keyword that is mapped to the alias number ("no" at decision block 710), the process 700 may proceed to decision block 714. At decision block 714, the communication application may determine whether the keyword query partially matches one or more additional keywords in the alias number data store. Alternatively, the determination may be made by the core network 108 of the wireless carrier network 102. At decision block 714, if the keyword query partially matches one or more additional keywords ("yes" at decision block 714), the process 700 may proceed to block 716. At block 716, the communication application may retrieve one or more alias numbers from the alias number data store that are mapped to the one or more additional keywords for presentation on a display of the user device. In some embodiments, the one or more additional alias numbers may be presented by the communication application on a matching number display of a dialer interface. In embodiments in which the determination is made by the core network 108, the core network 108 may retrieve the one or more additional alias numbers from a network alias number data store and send the alias numbers to the user device. In turn, the communication application on the user device may receive the one or more additional alias numbers for display via the dialer interface.

Returning to decision block 714, if the keyword query partially does not match one or more additional keywords ("no" at decision block 714), the process 700 may proceed to block 718. At block 718, the communication application may present an indication that the keyword input is undefined. In some embodiments, the indication may be presented by the communication application on a matching number display of a dialer interface. At decision block 720, the communication application may determine whether a define keyword input is received for the keyword query. Accordingly, if the communication application determines that the define keyword input is received ("yes" at decision block 720), the process may proceed to block 722. At block 722, the communication application may map a keyword in the keyword query to an additional alias number stored in an alias number data store of the user device based on the input. In alternative embodiments, the core network 108 may map the keyword in the keyword query to an additional alias number stored in a network alias number data stored based on the input.

Figure 8:
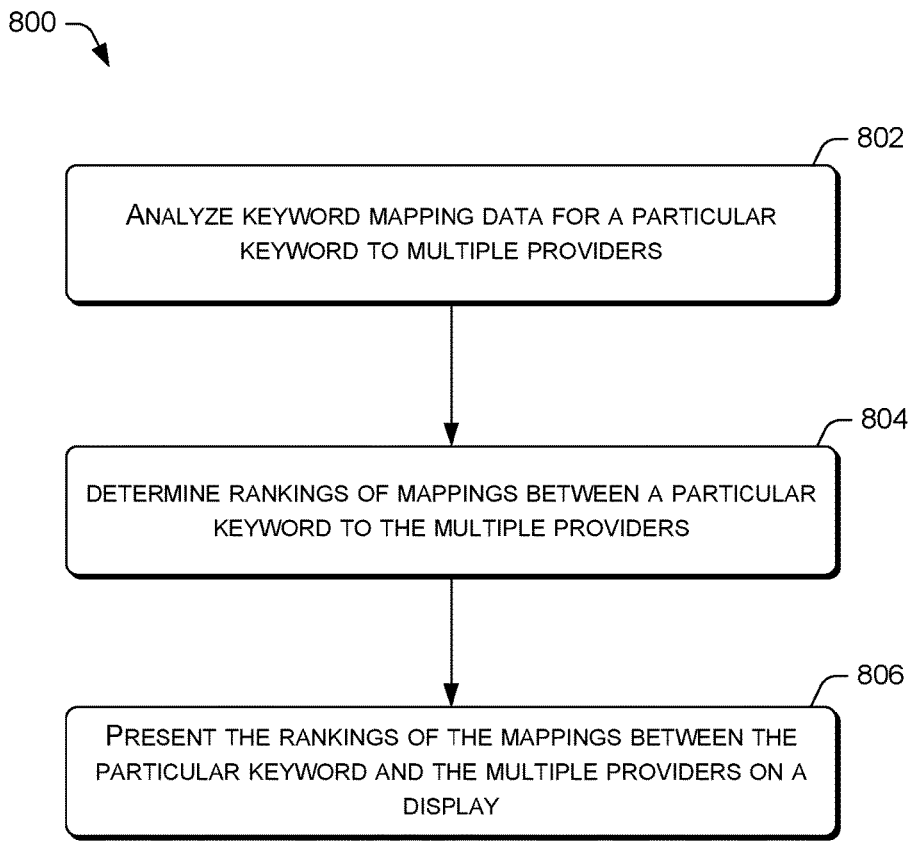
FIG. 8 is a flow diagram of an example process for providing ranking of associations between a particular keyword and multiple product or service providers.

FIG. 8 is a flow diagram of an example process 800 for providing ranking of associations between a particular keyword and multiple product or service providers. At block 802, computing devices at the core network of a wireless carrier network may analyze keyword mapping data for a particular keyword to multiple providers. For example, the computing devices may be the computing devices 110 in the core network 108 of the wireless carrier network 102. The mapping for the particular keyword to the multiple product or service providers may be performed by users of user devices through customization.

At block 804, the computing devices may determine rankings of mappings between a particular keyword to the multiple providers. For example, the analysis may show that the 6% of users served by the wireless carrier network 102 have configured the keyword "Pizza" to correspond to the alias number "51222 Pizza Palace", 3% of the users have configured the keyword "Pizza" to correspond to the alias number "51233 Pizza Shack", and 1% of the users have configured to keyword "Pizza" to correspond to the alias number "51244 Deluxe Pizza." Thus, "51222 Pizza Palace" is ranked first on a list, "51233 Pizza Shack" is ranked second on the list, and "51244 Deluxe Pizza" is ranked third of the list. At block 806, the computing devices may present the rankings of the mappings between the particular keyword and the multiple providers on a display.

The implementation of keyword based phone dialing may provide additional convenience to users that are subscribers of the wireless carrier network. For example, the use of keyword based phone dialing may enable a user may to initiate a call to a particular product or service provider without having to resort to a web search to look up the relevant telephone number. In this way, the implementation may reduce data traffic and the use of computational resources by the wireless carrier network for routing provider contact information search queries to search engines, as well as returning search results to user devices. Furthermore, because the display of alias numbers by a user device can be tailored to the dialing preferences and habits of a user, the user may choose to memorize alias numbers or associated keywords that are most meaningful to them.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media storing computer-executable instructions that upon execution cause one or more processors to perform acts comprising:
    receiving a user input of a string of one or more values into a communication application;
    checking the string as an alias number query against alias numbers in an alias number data store in response to determining that a numerical format of the string fails to match a telephone number numerical format, the alias numbers in the alias number data store including at least one alias number sponsored by one or more product or service providers and is inserted by a wireless carrier network into the alias number data store;
    presenting one or more alias numbers from the alias number data store that match or partially match the alias number query on a display using the communication application, each of the one or more alias numbers being associated with a different telephone number and being presented with a name of a corresponding product or service provider; and
    routing a telephone call to a product or service provider using an associated telephone number through the communication application in response to the communication application receiving a selection of a corresponding alias number,
    wherein a presentation of the corresponding alias number on the display results in a billing of a fee to the product or service provider for presenting the corresponding alias number on the display, and wherein the corresponding alias number is presented on the display along with an indicator indicating that the corresponding alias number is sponsored by the product or service provider.

2. The one or more non-transitory computer-readable media of claim 1, wherein each alias number is a shortcut number presented to enable a user to initiate a corresponding telephone call to a corresponding product or service provider without dialing a telephone number of the corresponding product or service provider.

3. The one or more non-transitory computer-readable media of claim 1, wherein the acts further comprise waiting for a call initiation input or call cancellation input in response to determining that the numerical format of the string matches the numerical format of a telephone number.

4. The one or more non-transitory computer-readable media of claim 1, wherein the acts further comprise storing the string of one or more values into a buffer of the communication application in response to determining that no new value is entered within a predetermined amount of time after an entry of the string or in response to an activation of a specific key following receiving the user input of the string, and wherein the checking includes retrieving the string from the buffer as the alias number query.

5. The one or more non-transitory computer-readable media of claim 1, wherein the acts further comprise:
    checking an additional string as received by the communication application against the alias numbers in the alias number data store in response to determining that an additional numerical format of the additional string fails to match the telephone number numerical format; and
    creating a new alias number entry in the alias number data store in response to a user inputted command following a determination that no alias number in the alias number data store matches or partially matches the additional string, the new alias number entry including a provider name and a provider telephone number of a product or service provider associated with the additional string.

6. The one or more non-transitory computer-readable media of claim 1, wherein acts further comprise presenting at least one of one or more contact numbers that partially match the string or one or more star codes that match or partially match the string.

7. The one or more non-transitory computer-readable media of claim 1, wherein the presenting the one or more alias numbers that partially match the string includes presenting an alias number that share a prefix series of values with the string.

8. The one or more non-transitory computer-readable media of claim 1, wherein the alias number data store is a data store located on a user device that executes the communication application or a data store located on a core network of a wireless carrier network.

9. The one or more non-transitory computer-readable media of claim 8, wherein the data store located on the user device includes alias numbers that are customizable via at least one of creation, deletion, or update, and wherein the data store located on the core network includes an alias number that is distributed to multiple communication applications in response to an identical input string from the multiple communication applications.

10. The one or more non-transitory computer-readable media of claim 1, wherein the alias number data store selected for use with the alias number query is associated with a device identifier, a subscriber access identifier, or a user identifier.

11. The one or more non-transitory computer-readable media of claim 1, wherein the acts further comprise:
receiving a keyword query at the communication application that is inputted via a numerical keypad or a voice user interface of a user device;
presenting one or more additional alias numbers from the alias number data store that are mapped to one or more keywords that match or partially match the keyword query, each of the one more additional alias numbers being associated with a different telephone number and being presented with a name of a corresponding product or service provider; and
routing an additional telephone call to an additional product or service provider using a corresponding telephone number through the communication application in response to the communication application receiving a selection of a corresponding alias number.

12. The one or more non-transitory computer-readable media of claim 11, wherein the acts further comprise:
receiving a user input that maps the keyword with an alias number of a product or service provider in the alias number data store; and
mapping the keyword to the alias number of the product or service provider in the alias number data store based on the user input.

13. The one or more non-transitory computer-readable media of claim 11, wherein the acts further comprise:
receiving an additional keyword query at the communication application that is inputted via the numerical keypad or the voice user interface of a user device;
receiving a define keyword input following a determination that the additional keyword query does not match or partially match keywords that are mapped to alias numbers in the alias number data store; and
mapping a keyword in the additional keyword query to an additional alias number stored in the alias number data store based on the define keyword input.

14. A computer-implemented method, comprising:
receiving a keyword query at a communication application on a user device that is inputted via a numerical keypad or a voice user interface of the user device;
presenting one or more alias numbers from an alias number data store that are mapped to one or more keywords that match or partially match the keyword query on a display of the user device, each of the one more alias numbers being associated with a different telephone number, messaging session number, web address, or data connectivity network address, and being presented with a name of a corresponding product or service provider, the alias number data store including at least one alias number sponsored by one or more product or service providers and is inserted by a wireless carrier network into the alias number data store; and
routing a communication to a product or service provider using an associated telephone number, messaging session number, web address, or data connectivity network address through the communication application in response to the communication application receiving a selection of a corresponding alias number,
wherein a presentation of the corresponding alias number on the display of the user device results in a billing of a fee to the product or service provider for presenting the corresponding alias number on the display, and wherein the corresponding alias number is presented on the display along with an indicator indicating that the corresponding alias number is sponsored by the product or service provider.

15. The computer-implemented method of claim 14, wherein each alias number is a shortcut number presented to enable a user to initiate a corresponding communication to a corresponding product or service provider in a geographical area that encompasses or is closest to a current geolocation of the user device without dialing a telephone number of the corresponding product or service provider.

16. The computer-implemented method of claim 14, wherein the presenting includes providing the one or more alias numbers via an interactive function that uses audio or text message prompts to direct a user to input a selection of a product or service provider associated with an alias number via a numerical keypad input or a text message input in order to initiate a telephone call to the product or service provider, and wherein the product or service provider is at least one of closest to a current geolocation of the user device, most popular in a geographical area that encompasses or is near the current geolocation of the user device, or has paid a fee to be associated with the alias number.

17. The computer-implemented method of claim 14, further comprising:
receiving an additional keyword query at the communication application that is inputted via the numerical keypad or the voice user interface of a user device;
determining that the additional keyword query does not match or partially match the keywords that are mapped to alias numbers in the alias number data store;
receiving a define keyword input following a presentation of an indication that the additional keyword query does not match or partially match the keywords that are mapped to alias numbers in the alias number data store on a display of the user device; and
mapping a keyword in the additional keyword query to an additional alias number stored in the alias number data store based on the define keyword input.

18. The computer-implemented method of claim 14, wherein the alias number data store is a first data store located on a user device that executes the communication application or a second data store located on a core network of a wireless carrier network, and wherein the first data store includes alias numbers that customizable via at least one of creation, deletion, or update, and wherein the second data store includes an alias number that is distributed to multiple communication applications in response to an identical input string from the multiple communication applications.

19. The computer-implemented method of claim 14, wherein the alias number data store is associated with a device identifier, a subscriber access identifier, or a user identifier.

20. A user device, comprising:
one or more processors; and
memory including a plurality of computer-executable components that are executable by the one or more processors to perform a plurality of actions, the plurality of actions comprising:
receiving a user input of a string of one or more values into a communication application;
storing the string of one or more values into a buffer of the communication application in response to determining that no new value is entered within a predetermined amount of time after an entry of the string or in response to an activation of a specific key following receiving the user input of the string;

retrieving the string as an alias number query for checking against alias numbers in an alias number data store in response to determining that a numerical format of the string fails to match a telephone number numerical format, the alias numbers in the alias number data store including at least one alias number sponsored by one or more product or service providers and is inserted by a wireless carrier network into the alias number data store;

presenting one or more alias numbers from the alias number data store that match or partially match the alias number query on a display using the communication application, each of the one more alias numbers being associated with a different telephone number and being presented with a name of a corresponding product or service provider and is a shortcut number presented to enable a user to initiate a corresponding telephone call to a corresponding product or service provider without dialing a telephone number of the corresponding product or service provider;

routing a telephone call to a product or service provider using a corresponding telephone number through the communication application in response to the communication application receiving a selection of a corresponding alias number, wherein a presentation of the corresponding alias number on the display results in a billing of a fee to the product or service provider for presenting the corresponding alias number on the display, and wherein the corresponding alias number is presented on the display along with an indicator indicating that the corresponding alias number is sponsored by the product or service provider.

* * * * *